United States Patent
Foerster et al.

(10) Patent No.: US 11,117,440 B2
(45) Date of Patent: Sep. 14, 2021

(54) HEAT PUMP HEATER

(71) Applicant: Mahle International GmbH, Stuttgart (DE)

(72) Inventors: Uwe Foerster, Erdmannhausen (DE); Martin Sievers, Stuttgart (DE)

(73) Assignee: Mahle International GmbH

(*) Notice: Subject to any disclaimer, the term of this patent is extended or adjusted under 35 U.S.C. 154(b) by 0 days.

(21) Appl. No.: 16/556,217

(22) Filed: Aug. 29, 2019

(65) Prior Publication Data

US 2020/0070620 A1 Mar. 5, 2020

(30) Foreign Application Priority Data

Aug. 31, 2018 (DE) .......................... 102018214871.6

(51) Int. Cl.
| | | |
|---|---|---|
| *F28F 9/02* | (2006.01) | |
| *B60H 1/00* | (2006.01) | |
| *F28D 1/053* | (2006.01) | |
| *F25B 39/04* | (2006.01) | |
| *F28F 1/02* | (2006.01) | |

(52) U.S. Cl.
CPC ......... *B60H 1/00328* (2013.01); *F25B 39/04* (2013.01); *F28D 1/05383* (2013.01); *F28F 9/026* (2013.01); *F28F 1/022* (2013.01); *F28F 2250/06* (2013.01)

(58) Field of Classification Search
CPC .... F25B 39/04; F25B 2339/0444; F25B 9/08; F25B 9/10; F28F 9/02; F28F 9/028; F28F 9/0212; F28F 9/0214; F28F 2250/06
See application file for complete search history.

(56) References Cited

U.S. PATENT DOCUMENTS

| 4,141,409 A * | 2/1979 | Woodhull, Jr. ........... F28B 1/00 |
| | | 165/110 |
| 2002/0084063 A1* | 7/2002 | Gawthrop ............... F25B 39/04 |
| | | 165/110 |
| 2013/0312454 A1 | 11/2013 | Jeon et al. |

(Continued)

FOREIGN PATENT DOCUMENTS

| DE | 602005004094 T2 | 12/2008 | |
| DE | 112013002638 T5 | 3/2015 | |
| FR | 2665757 A1 * | 2/1992 | .............. F28F 9/028 |

(Continued)

OTHER PUBLICATIONS

English abstract for DE-602005004094.

*Primary Examiner* — Eric S Ruppert

(74) *Attorney, Agent, or Firm* — Fishman Stewart PLLC

(57) ABSTRACT

A heat pump heater for an air conditioning system of a motor vehicle may include a first tube row and a second tube row each including a plurality of flat tubes arranged spaced apart from one another. The first and second tube row may be arranged in parallel to form a tube block. At least some flat tubes of the first tube row may lead into an inlet pipe and at least some flat tubes of the second tube row may lead into an outlet pipe. A refrigerant may be flowable from the inlet pipe via the first tube row and to the outlet pipe via the second tube row. The inlet pipe and the outlet pipe may be fluidically connected to one another via at least one bypass duct such that a liquid phase of the refrigerant is flowable out of the inlet pipe into the outlet pipe.

16 Claims, 3 Drawing Sheets

(56) References Cited

U.S. PATENT DOCUMENTS

2016/0138871 A1 * 5/2016 Matsumoto ............. F28F 9/262
                                                                  165/143

FOREIGN PATENT DOCUMENTS

| | | | | | |
|---|---|---|---|---|---|
| GB | 296353 | A | * | 11/1929 | .............. F25B 39/04 |
| JP | 2000081294 | A | * | 3/2000 | ......... F28D 1/05391 |
| JP | 2007322089 | A | * | 12/2007 | |
| WO | WO-2008110249 | A1 | * | 9/2008 | ............ F28F 9/0278 |
| WO | WO-2012041441 | A3 | | 8/2012 | |

* cited by examiner

HEAT PUMP HEATER

CROSS-REFERENCE TO RELATED APPLICATIONS

This application relates to German Patent Application No. DE 10 2018 214 871.6, filed on Aug. 31, 2018, the contents of which are hereby incorporated by reference in its entirety.

TECHNICAL FIELD

The invention relates to a heat pump heater for an air conditioning system of a motor vehicle.

BACKGROUND

Heat pump heaters can be employed in an air conditioning system of a motor vehicle in order to heat air flowing into a passenger compartment. A heat pump heater comprises multiple flat tubes through which refrigerant can flow, which flat tubes are arranged spaced from one another in a heater block. Air flowing into the passenger compartment circulates about the flat tubes in the heater block so that air exchanges the heat with the refrigerant in the flat tubes and is heated up. After the heat pump heater, the heated-up air is apportioned to air nozzles of the air conditioning system and conducted to the outlets. The aim is as uniform as possible an air temperature at all outlets of the air conditioning system. In order to achieve this, the air temperature should be preferably uniform over an entire air-side outlet area of the heat pump heater. This is not easily possible in particular with operating points having a large temperature gradient of the refrigerant and a large temperature differential between the air to be heated and the refrigerant.

From the prior art, both single-row and also multi-row heat pump heaters, such as described for example in WO 2012 041441 A3, are known. In contrast with the single-row heat pump heater, the flat tubes in the multi-row heat pump heater are arranged in multiple rows to form multiple sub-blocks, which are fixed one behind the other to form the heater block and are flowed through by air in succession. The single-row heat pump heater disadvantageously has a highly irregular air temperature over the outlet area, since the refrigerant cools down in the refrigerant flow direction. This reduces the driving temperature differential of the heat transfer between the refrigerant and air. In addition, the heat transfer coefficient in the flat tubes drops because of the falling vapour content. In the two-row heat pump heater, the hot refrigerant initially flows through the second sub-block and the already cooled-down refrigerant flows through the first sub-block thereafter. In this way, the distribution of the air temperature over the outlet area of the heat pump heater can be at least partly compensated.

The temperature of the refrigerant in the respective flat tube falls in the refrigerant flow direction. Furthermore, the differences in the temperature of the refrigerant also exists between the individual flat tubes. This can be attributed among other things to the uneven distribution of the mass flow and of the liquid and gaseous phase of the refrigerant in the flat tube through which it flows. Because of this, the heat pump heater heats to a different degree on opposite sides and the air temperature is unevenly apportioned to the outlet area of the heat pump heater. However, such an uneven side-based distribution and in particular an uneven left-right distribution—here based on the motor vehicle—of the air temperature over the outlet area of the heat pump heater is to be avoided in an air conditioning system. For this reason, the heat pump heater is usually installed in the air conditioning system of the motor vehicle in such a manner that the flat tubes of the heat pump heater are orientated vertically. The uneven change of the temperature of the refrigerant in the refrigerant flow direction and because of this the uneven distribution of the air temperature over the outlet area of the heat exchanger is then orientated vertically. In principle, equalising the air temperature over the outlet area of the heat pump heater poses a challenge.

SUMMARY

The object of the invention therefore is to state an improved or at least alternative embodiment for a heat pump heater of the generic type with which the described disadvantages are overcome.

According to the invention, this object is solved through the subject of the independent claim(s). Advantageous embodiments are subject of the dependent claim(s).

A generic heat pump heater for an air conditioning system of a motor vehicle comprises a first tube row with multiple flat tubes arranged spaced from one another and a second tube row with multiple flat tubes arranged spaced from one another. The first tube row is arranged parallel with the second tube row and a tube block of the heat pump heater is thereby formed. At a connecting point of the tube block, at least some flat tubes of the first tube row lead, via an inlet base, into an inlet pipe and at least some flat tubes of the second tube row, via an outlet base, into an outlet pipe. The heat pump heater can be flowed through by a refrigerant from the inlet pipe via the flat tubes of the first row and via the flat tubes of the second row to the outlet pipe. According to the invention, the inlet pipe and the outlet pipe are fluidically connected to one another via at least one bypass duct, so that a liquid phase of the refrigerant can flow via the at least one bypass duct, bypassing the flat tubes, out of the inlet pipe into the outlet pipe.

The mass flow of the liquid oil-rich phase of the refrigerant is conducted through the bypass duct in this manner and no longer passes the flat tubes of the heat pump heater. By way of this, the mass flow of the gaseous phase in the flat tube can be increased. In particular, the uneven distribution of the air temperature at the outlet from the tube block can thereby be reduced. Since the specific enthalpy differential of the gaseous phase of the refrigerant is higher than the enthalpy differential of the liquid phase of the refrigerant in the inlet pipe and in the outlet pipe, more heat can, furthermore, be transferred in the tube block to the air flowing through the tube block.

Advantageously, the heat pump heater can be designed both in two rows and also multiple rows. In the case of the two-row heat pump heater it is provided that at a diversion point of the tube block at least some flat tubes of the first tube row and at least some flat tubes of the second tube row lead into a common diversion manifold via a diversion base. With the multi-row heat pump heater it is provided that at least two further tube rows are arranged between the first tube row and the second tube row. Here, at least some flat tubes of the respective tube rows arranged next to one another lead, at diversion points of the tube block, into a common diversion manifold each via a diversion base each.

In an advantageous configuration of the heat pump heater according to the invention it is provided that the connecting point is arranged on a connecting side of the tube block and the diversion point at a diversion side of the tube block located opposite the connecting side. By way of this, the flat tubes of the first tube row can be flowed through by the refrigerant in a first flow direction and the flat tubes of the second tube row in a second flow direction directed opposite to the first flow direction. When the heat pump heater is constructed in multiple rows, the flow direction in the adjacent tube rows of the tube block deviates. The diversion manifold then practically extends over the entire diversion side and the inlet pipe and the outlet pipe practically extend over the entire connecting side of the tube block. The refrigerant can then flow via the inlet pipe into all flat tubes of the first row to the diversion manifold. In the diversion manifold, the refrigerant can be diverted and flows in the two-row heat pump heater via all flat tubes of the second tube row to the outlet pipe and in the multi-row heat pump heater via all flat tubes of the further tube rows and subsequently via all flat tubes of the second tube row to the outlet pipe.

In an alternative configuration of the heat pump heater according to the invention it is provided that the connecting point and the diversion point are arranged on a common connecting side of the tube block. Some of the flat tubes of the first tube row and of the second tube row can then be flowed through by the refrigerant in a first flow direction and some of the flat tubes of the first tube row and of the second tube row in a second flow direction that is directed opposite to the first flow direction. In the two-row heat pump heater, the refrigerant flows out of the inlet pipe via some of the flat tubes of the first tube row to a first tube manifold, which is arranged on a diversion side located opposite the connecting side. In the first tube manifold, the refrigerant is diverted and flows via the remaining flat tubes of the first row to the diversion manifold. In the diversion manifold, the refrigerant can be diverted and flows through some of the flat tubes of the second tube row towards the diversion side. Here, the refrigerant can be diverted in a second tube manifold and flows via the remaining flat tubes of the second tube row to the outlet pipe on the connecting side. In the multi-row heat pump heater, the refrigerant flows out of the inlet pipe via some of the flat tubes of the first tube row to the first tube manifold on the diversion side. In the first tube manifold, the refrigerant is diverted and flows via the remaining flat tubes of the first row to the diversion manifold. In the diversion manifold, the refrigerant can be diverted and flows through some of the flat tubes of the further tube row towards the diversion side. Here, the refrigerant can be deflected in a further tube manifold and flows through some of the flat tubes of the further tube row towards a further diversion manifold on the connecting side. The refrigerant is now conducted in the same manner through the further tube rows to the second tube row and subsequently to the outlet pipe.

Regardless of the configuration of the heat pump heater according to the invention, the distribution of the air temperature during the exit of the air from the heat pump heater can be compensated by the at least one bypass duct between the inlet pipe and the outlet pipe.

Advantageously it can be provided that the at least one bypass duct is arranged in an end region of the inlet pipe. Here, the end region is arranged located opposite to an inlet opening of the inlet pipe in the flow direction. In this advantageous way, the liquid phase of the refrigerant can be preferably conducted through the bypass duct and thereby a possible reduction in performance of the heat pump heater avoided. Alternatively or additionally it can be provided that the at least one bypass duct is arranged in a lower region of the inlet pipe. The lower region of the inlet pipe in this case is arranged located opposite the inlet phase and extends over half a width of the inlet pipe in the longitudinal direction of the flat tubes. In this advantageous way it can be avoided that the gaseous phase of the refrigerant flows through the bypass duct and the performance of the heat pump heater is thereby reduced.

In an advantageous configuration of the heat pump heater it is provided that the at least one bypass duct is formed by a bypass pipe. Here, the bypass pipe fluidically connects the inlet pipe and the outlet pipe and is embodied as a separate component. Practically, connecting points between the bypass pipe and the inlet pipe and the outlet pipes are sealed towards the outside. In the heat pump heater, multiple bypass ducts can be provided and accordingly the inlet pipe and the outlet pipe fluidically connected to one another via multiple bypass pipes.

Advantageously it can be provided that the inlet pipe and the outlet pipe are arranged parallel and next to one another and are formed in a connecting manifold of the heat pump heater. In addition it can be provided that the at least one bypass duct is formed by a continuous bypass opening in the connecting manifold. Here, the bypass opening fluidically connects the inlet pipe and the outlet pipe. In the heat pump heater, multiple bypass ducts can be provided and accordingly the inlet pipe and the outlet pipe fluidically connected to one another via multiple bypass openings.

Advantageously it can be provided that the at least one bypass duct has a round or a square or an oval or a rectangular or a polygonal cross section. When the heat pump heater comprises multiple bypass ducts, some or all bypass ducts can have cross sections that are distinct from one another or the same. In particular, a possible performance reduction in the heat pump heater can be avoided through the matched cross section of the at least one bypass duct. Advantageously, a cross-sectional area of the at least one bypass duct can be between 0.2 $mm^2$ and 9.0 $mm^2$. When the at least one bypass duct has a round cross section, a diameter of the bypass duct can be between 0.5 mm and 3.4 mm.

In summary, the uneven distribution of the air temperature of the air flowing through the tube block can be reduced in the heat pump heater according to the invention. In particular, a side-dependent distribution of the air temperature during the exit from the tube block can be avoided in the heat pump heater.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
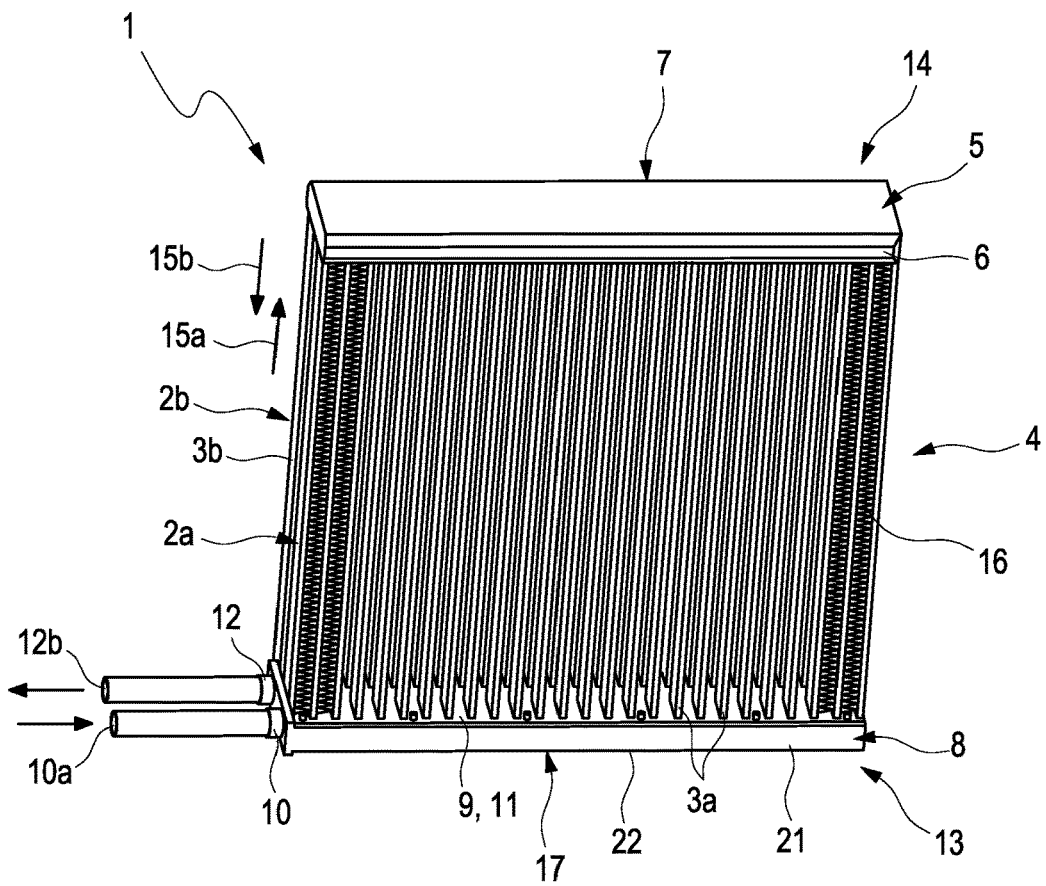
FIG. 1 shows a view of a heat pump heater according to the invention.

FIG. 1 shows a view of a heat pump heater 1 according to the invention for an air conditioning system of a motor vehicle. The heat pump heater 1 comprises a first tube row 2a with multiple flat tubes 3a arranged spaced from one another and a second tube row 2b with multiple flat tubes 3b spaced from one another. Here, the first tube row 2a is arranged on the second tube row 2b so that the tube rows 2a and 2b form a two-row tube block 4 of the heat pump heater 1. At a diversion point 5 of the tube block 4, the flat tubes 3a and 3b of the tube rows 2a and 2b lead into a common diversion manifold 7 via a diversion base 6. At a connecting point 8 of the tube blocks 4, the flat tubes 3a of the first tube row 2a lead into an inlet pipe 10 via an inlet base 9 and the flat tubes 3b of the second tube row 2b into an outlet pipe 12 via an outlet base 11. The inlet pipe 10 and the outlet pipe 12 are formed in a connecting manifold 12 and arranged next to one another. The connecting point 8 in this exemplary embodiment is arranged on a connecting side 13 of the tube block 4 and the diversion point 5 is arranged on a diversion side 14 of the tube block 4 located opposite the connecting side 13. Accordingly, the diversion manifold 7 is fixed on the diversion side 14 and the connecting manifold 17 on the connecting side 13.

In the heat pump heater 1, the refrigerant flows into the inlet pipe 10 via an inlet opening 10a and further through the flat tubes 3a of the first row 2a in a first flow direction 15a towards the diversion manifold 7. In the diversion manifold 7, the refrigerant is apportioned to the flat tubes 3b and flows through the same in a second flow direction 15b towards the outlet pipe 12. Following this, the refrigerant flows via an outlet opening 12b out of the outlet pipe 12. The air enters the heat pump heater 1 at an inlet surface—not visible here—and exits on an outlet area 16 located opposite. Here, the air first flows about the flat tubes 3b of the second tube row 2b with a cooler refrigerant and thereafter the flat tubes 3a of the first tube row 2a with the hotter refrigerant. According to the invention, the inlet pipe 10 and the outlet pipe 12 are connected by at least one bypass duct—as will be explained in more detail in the following by way of FIGS. 2 and 3—so that the flat tubes 3a and 3b are preferably flowed through by the gaseous phase of the refrigerant. In this way, the distribution of the air temperature over the outlet area 16 can be equalised—as will still be explained in more detail in the following by way of FIG. 4—and furthermore the heating-up of the air in the heat pump heater 1 intensified.

Figure 2:
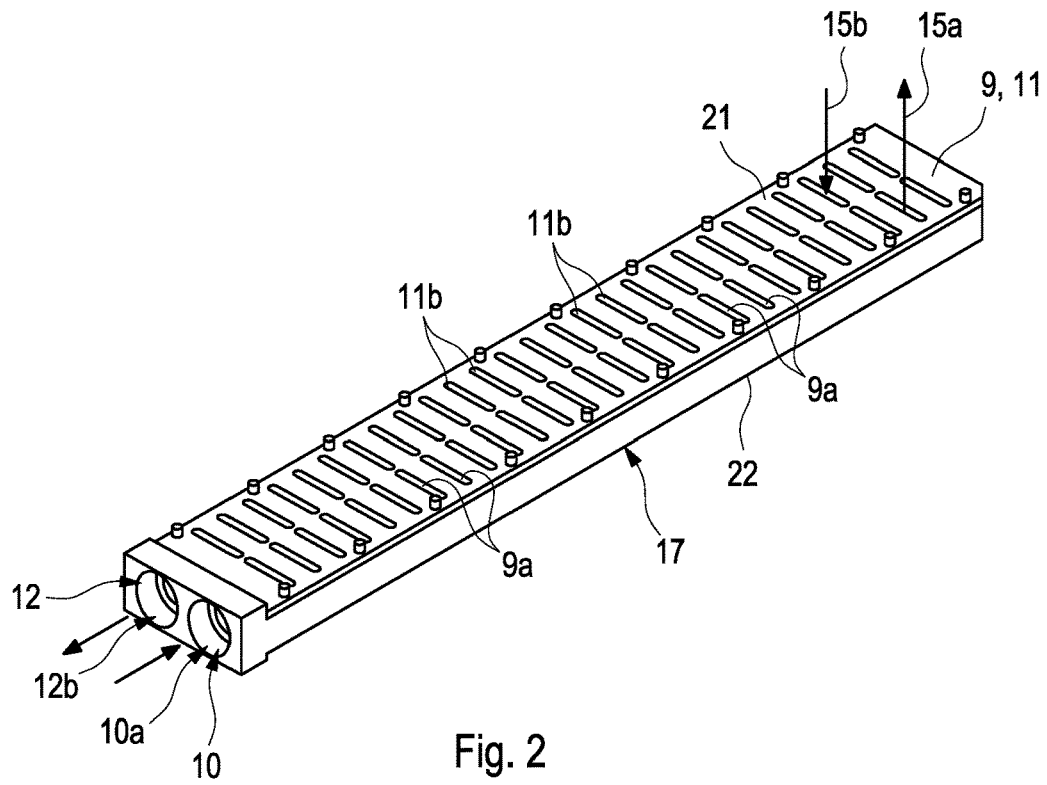
FIG. 2 shows a view of a connecting manifold with an inlet base and an outlet base in the heat pump heater according to the invention.
Figure 3:
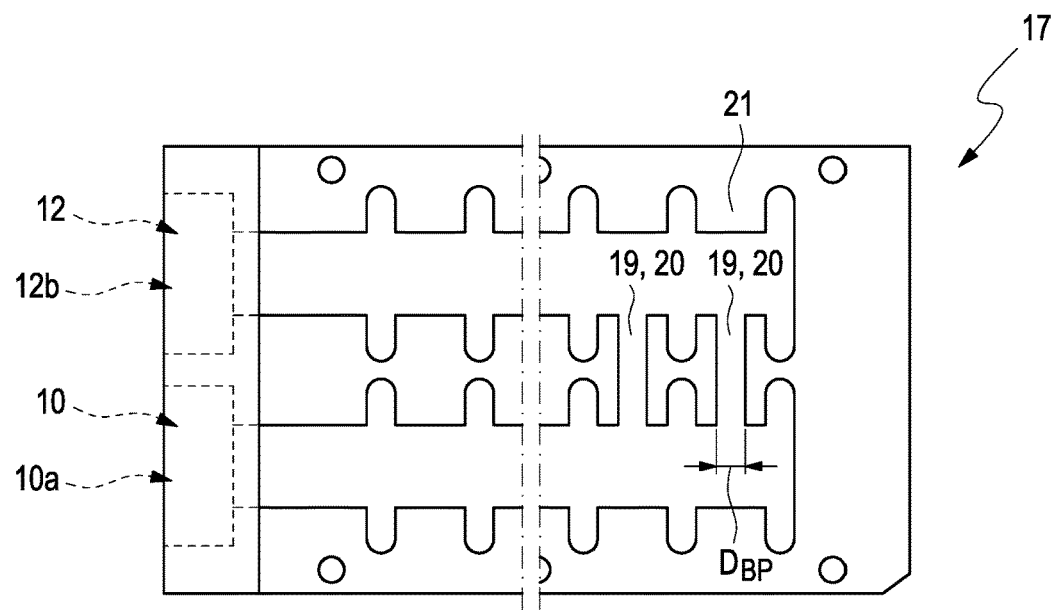
FIG. 3 shows a sectional view through the connecting manifold shown in FIG. 2.

FIG. 2 shows a view of the connecting manifold 17 with the inlet base 9 and with the outlet base 11. In FIG. 3, a sectional view of the connecting manifold 17 is shown. Here, the connecting manifold 17 comprises the inlet pipe 10 and the outlet pipe 12 which are formed in the connecting manifold 17. The connecting manifold 17 can be embodied single-row and also multi-row. In addition, the inlet base 9 comprises multiple continuous inlet passages 9a, via which the flat tubes 3a of the first tube row 2a are fluidically connected to the inlet pipe 10. Analogously, the outlet base 11 comprises multiple continuous outlet passages 11b via which the flat tubes 3b of the second tube row 2b are fluidically connected to the outlet pipe 12.

Making reference to FIG. 3, the inlet pipe 10 and the outlet pipe 12 are fluidically connected to one another by bypass ducts 19. The mass flow of the liquid phase of the refrigerant can then be conducted through the bypass ducts 19 and does no longer pass the flat tubes 3a and 3b of the heat pump heater 1. By way of this, the mass flow of the gaseous phase in the flat tubes 3a and 3b can be increased. In particular, more heat can thereby be transferred in the tube block 4 to the air flowing through the tube block 4 and the distribution of the air temperature over the outlet area 16 of the tube block 4 improved or equalised.

In this exemplary embodiment, the bypass ducts 19 are each formed by a continuous bypass opening 20 in the connecting manifold 17. Here, the bypass openings 20 fluidically connect the inlet pipe 10 and the outlet pipe 12. Here, the bypass openings 20 are arranged in an end region 21 of the inlet pipe 10 which is located opposite the inlet opening 10a of the inlet pipe 10. In addition, the bypass openings 20 are arranged in a lower region 22 of the inlet pipe 10. The lower region 22 is arranged located opposite the inlet base 9 and extends over half a width of the inlet pipe 10 in the longitudinal direction of the flat tubes 3a or in a first flow direction 15a of the refrigerant. Through this advantageous arrangement of the bypass openings 20 it can be avoided that the gaseous phase of the refrigerant flows through the bypass openings and the performance of the heat pump heater 1 is thereby reduced. In this exemplary embodiment, the bypass openings 20 have a round cross section. A diameter $D_{BP}$ of the bypass openings 20 is preferably between 0.5 mm and 3.4 mm.

Figure 4:
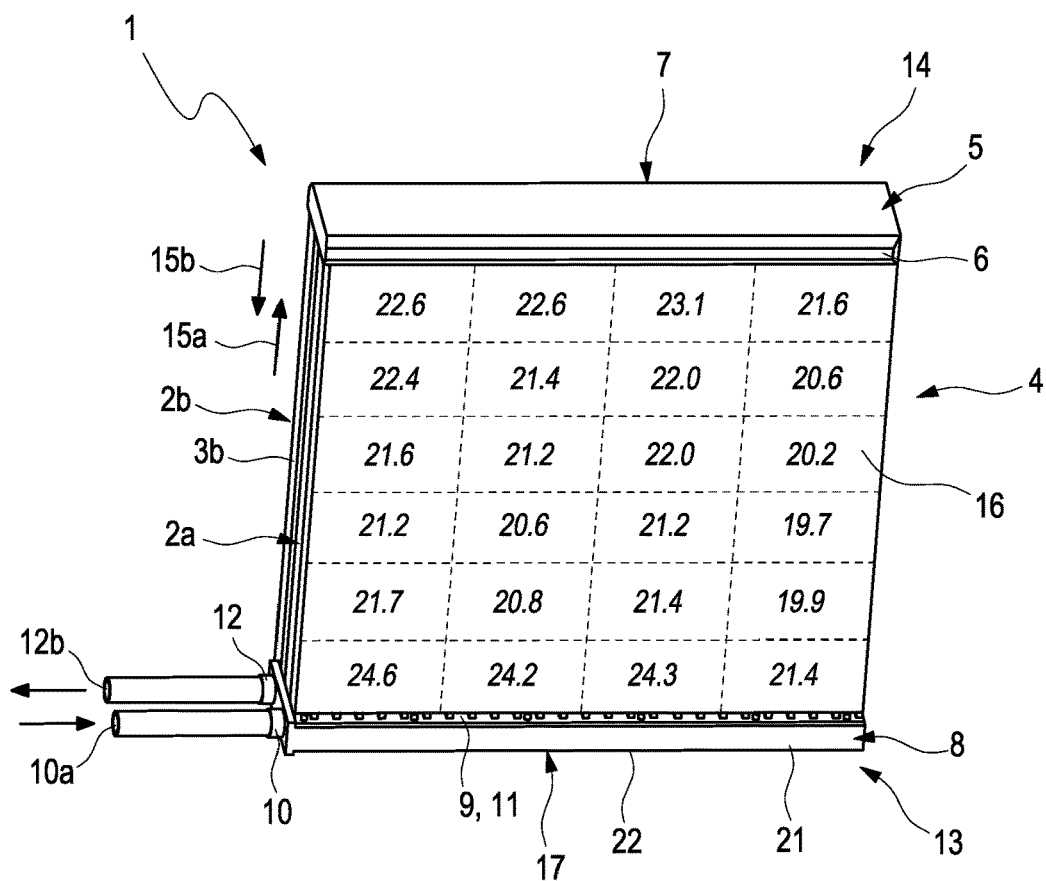
FIG. 4 shows a view of the heat pump heater according to the invention with the distribution of the air temperature on an outlet area.

FIG. 4 shows a view of the heat pump heater 1 with the distribution of the air temperature on the outlet area 16. Here, the heat pump heater 1 was operated with the refrigerant having an oil proportion of 5% by mass in part load and the air temperature on entering the tube block 4 was around 15° C. On the outlet area 16, differences between the air temperature on entering the tube block 4 and on exiting the tube block 4 are each entered. Advantageously, the values over the outlet area 16 merely differ by a few ° C. so that a side-dependent distribution of the air temperature over the outlet area 16 in the heat pump heater 1 according to the invention is advantageously reduced significantly.

Figure 5:
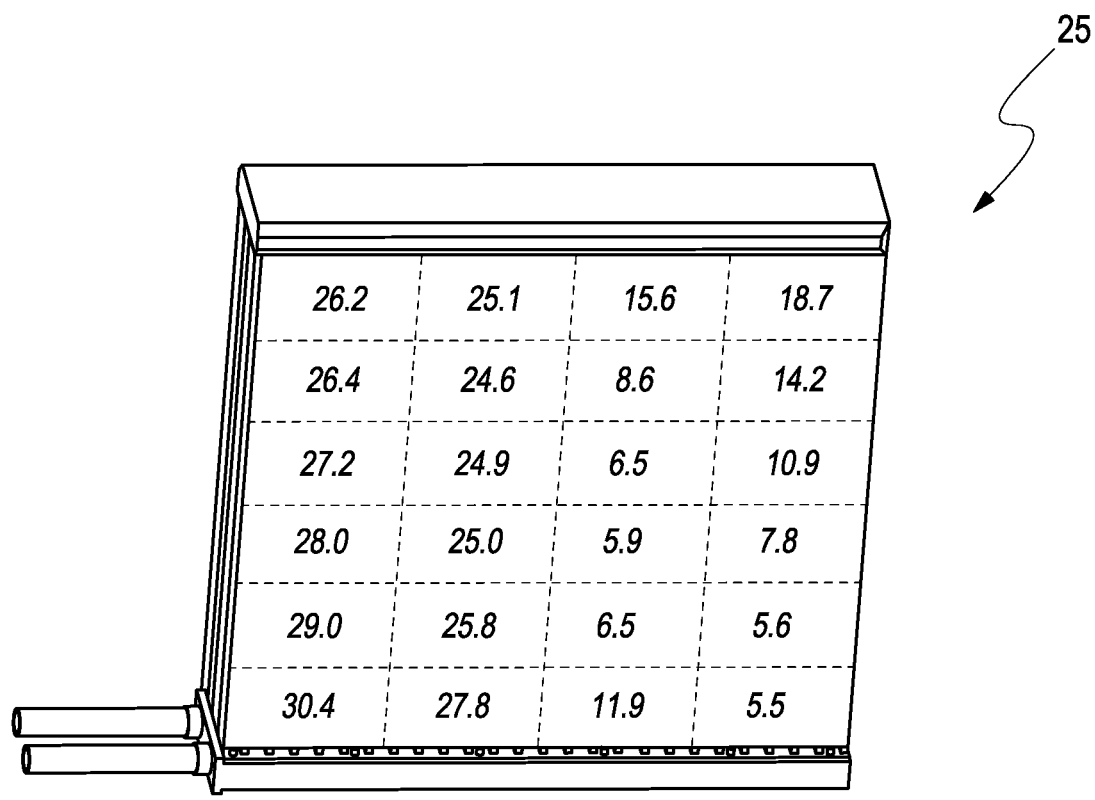
FIG. 5 shows a view of the conventional heat pump heater with the distribution of the air temperature on an outlet area.

By comparison, FIG. 5 shows a view of a heat pump heater 25 according to the prior art. In contrast with the heat pump heater 1 according to the invention, the conventional heat pump heater 25 does not have a bypass duct. Otherwise, the construction of the heat pump heater 25 corresponds to the construction of the heat pump heater 1 according to the invention. As in FIG. 4, the heat pump heater 25 in this case was operated with the refrigerant having an oil proportion of 5% by mass in part load and the air temperature on entering the tube block was around 15° C. The values over the outlet area in the conventional heat pump heater 25 differ in contrast with the heat pump heater 1 according to the invention by up to 25° C., so that a side-dependent distribution of the air temperature over the outlet area in the heat pump heater 25 is substantial.

The invention claimed is:

1. A heat pump heater for an air conditioning system of a motor vehicle, comprising:
   a first tube row including a plurality of flat tubes arranged spaced apart from one another;
   a second tube row including a plurality of flat tubes arranged spaced apart from one another;
   the first tube row and the second tube row arranged in parallel to form a tube block;

at a connecting point of the tube block, at least some of the plurality of flat tubes of the first tube row lead into an inlet pipe via an inlet base and at least some of the plurality of flat tubes of the second tube row lead into an outlet pipe via an outlet base;

wherein a refrigerant is flowable from the inlet pipe via the plurality of flat tubes of the first tube row and to the outlet pipe via the plurality of flat tubes of the second tube row; and wherein the inlet pipe and the outlet pipe are fluidically connected to one another via at least one bypass duct such that a liquid phase of the refrigerant is flowable via the at least one bypass duct, bypassing the plurality of flat tubes of the first tube row and the plurality of flat tubes of the second tube row, out of the inlet pipe into the outlet pipe;

wherein the inlet pipe, the outlet pipe, and the at least one bypass duct are each disposed in and at least partially defined by a connecting manifold;

wherein the inlet pipe and the outlet pipe extend parallel and next to one another in the connecting manifold;

wherein the inlet pipe is formed by a first recess disposed in the connecting manifold;

wherein the outlet pipe is formed by a second recess disposed in the connecting manifold; and wherein the at least one bypass duct is formed by a continuous bypass opening disposed in the connecting manifold and extending between the first recess and the second recess.

2. The heat pump heater according to claim 1, wherein the at least one bypass duct is arranged in an end region of the inlet pipe, the end region arranged opposite to an inlet opening of the inlet pipe relative to a flow direction through the inlet pipe.

3. The heat pump heater according to claim 1, wherein the at least one bypass duct is arranged in a lower region of the inlet pipe, and wherein the lower region of the inlet pipe is arranged opposite the inlet base and extends over half a width of the inlet pipe in a longitudinal direction of the plurality of flat tubes of the first tube row.

4. The heat pump heater according to claim 1, wherein the at least one bypass duct is defined by a bypass pipe which fluidically connects the inlet pipe and the outlet pipe.

5. The heat pump heater according to claim 1, wherein the at least one bypass duct has one of a round cross section, a square cross section, an oval cross section, and a rectangular cross section.

6. The heat pump heater according to claim 1, wherein a cross-sectional area of the at least one bypass duct is 0.2 mm$^2$ to 9.0 mm$^2$.

7. The heat pump heater according to claim 1, wherein the at least one bypass duct has a round cross section with a diameter of 0.5 mm to 3.4 mm.

8. The heat pump heater according to claim 1, wherein at least one of:

at a diversion point of the tube block, at least some of the plurality of flat tubes of the first tube row and at least some of the plurality of flat tubes of the second tube row lead into a common diversion manifold via a diversion base; and at least two further tube rows are arranged between the first tube row and the second tube row, the at least two further tube rows each including a plurality of flat tubes, and wherein at a plurality of diversion points of the tube block at least some of the plurality of flat tubes of tube rows arranged next to one another lead into a respective common diversion manifold via a respective diversion base.

9. The heat pump heater according to claim 8, wherein the tube block includes the diversion point, and wherein at least one of:

the connecting point is arranged on a connecting side of the tube block and the diversion point is arranged on a diversion side of the tube block disposed opposite the connecting side such that the refrigerant is flowable through the plurality of flat tubes of the first tube row in a first flow direction and through the plurality of flat tubes of the second tube row in a second flow direction opposite the first flow direction; and the connecting point and the diversion point are arranged on a common connecting side of the tube block such that the refrigerant is flowable through some of the plurality of flat tubes of the first tube row and some of the plurality of flat tubes of the second tube row in a first flow direction and some of the plurality of flat tubes of the first tube row and some of the plurality of flat tubes of the second tube row in a second flow direction opposite the first flow direction.

10. A heat pump heater for an air conditioning system of a motor vehicle, comprising:

a tube block including a first tube row and a second tube row arranged in a parallel manner, the first tube row and the second tube row each including a plurality of flat tubes arranged spaced apart from one another;

an inlet pipe connected to at least some of the plurality of flat tubes of the first tube row via an inlet base such that refrigerant is flowable out from the inlet pipe via the plurality of flat tubes of the first tube row;

an outlet pipe connected to at least some of the plurality of flat tubes of the second tube via an outlet base such that refrigerant is flowable into the outlet pipe via the plurality of flat tubes of the second tube row;

at least one bypass duct fluidically connecting the inlet pipe and the outlet pipe such that a liquid phase of refrigerant bypasses the plurality of flat tubes of the first tube row and the plurality of flat tubes of the second tube row and is flowable out of the inlet pipe and into the outlet pipe;

a connecting manifold in which the inlet pipe, the outlet pipe, and the at least one bypass duct are disposed; and wherein the connecting manifold includes a first recess defining the inlet pipe, a second recess defining the outlet pipe, and a continuous bypass opening defining the at least one bypass, the continuous bypass opening extending through the connecting manifold between the first recess and the second recess.

11. The heat pump heater according to claim 10, wherein the at least one bypass duct includes a plurality of bypass ducts disposed spaced apart from one another.

12. The heat pump heater according to claim 10, further comprising a common diversion manifold, wherein at least some of the plurality of flat tubes of the first tube row and at least some of the plurality of flat tubes of the second tube row are connected to the common diversion manifold at a diversion point of the tube block via a diversion base.

13. The heat pump heater according to claim 12, wherein the connecting point of the tube block and the diversion point of the tube block are disposed on opposed ends of the tube block such that refrigerant is flowable through the plurality of flat tubes of the first tube row in a first flow direction and through the plurality of flat tubes of the second tube row in a second flow direction opposite the first flow direction.

14. The heat pump heater according to claim 12, wherein the connecting point of the tube block and the diversion point of the tube block are disposed on a same end of the tube block such that refrigerant is flowable through some of the plurality of flat tubes of the first tube row and some of the plurality of flat tubes of the second tube row in a first flow direction and through some of the plurality of flat tubes of the first tube row and some of the plurality of flat tubes of the second tube row in a second flow direction opposite the first flow direction.

15. A heat pump heater for an air conditioning system of a motor vehicle, comprising:
- a tube block including a first tube row and a second tube row arranged in a parallel manner, the first tube row and the second tube row each including a plurality of flat tubes arranged spaced apart from one another;
- an inlet pipe connected to at least some of the plurality of flat tubes of the first tube row via an inlet base such that refrigerant is flowable out from the inlet pipe via the plurality of flat tubes of the first tube row;
- an outlet pipe connected to at least some of the plurality of flat tubes of the second tube via an outlet base such that refrigerant is flowable into the outlet pipe via the plurality of flat tubes of the second tube row;
- at least one bypass duct fluidically connecting the inlet pipe and the outlet pipe such that a liquid phase of refrigerant bypasses the plurality of flat tubes of the first tube row and the plurality of flat tubes of the second tube row and is flowable out of the inlet pipe and into the outlet pipe;
- wherein the inlet pipe includes an inlet opening via which refrigerant is flowable into the inlet pipe, the outlet pipe includes an outlet opening via which refrigerant is flowable out of the outlet pipe, and the at least one bypass duct extends between the inlet pipe and the outlet pipe in an end region disposed opposite the inlet opening and the outlet opening;
- wherein the inlet pipe, the outlet pipe, and the at least one bypass duct are each disposed in and at least partially defined by a connecting manifold;
- wherein the at least one bypass duct is connected to a lower half of the inlet pipe disposed opposite the inlet base;
- wherein the inlet pipe is formed by a first recess disposed in the connecting manifold;
- wherein the outlet pipe is formed by a second recess disposed in the connecting manifold; and
- wherein the at least one bypass duct is formed by a continuous bypass opening disposed in the connecting manifold and extending between the first recess and the second recess.

16. The heat pump heater according to claim 1, wherein:
the first tube row and the second tube row extend parallel to one another in a longitudinal direction and are arranged adjacent to one another in a transverse direction; and
the inlet pipe and the outlet pipe each have a plurality of notches protruding therefrom into the connecting manifold in the transverse direction.

* * * * *